March 18, 1952 W. J. STAMPFL 2,589,888
FLOW CONTROL DEVICE
Filed Feb. 25, 1948
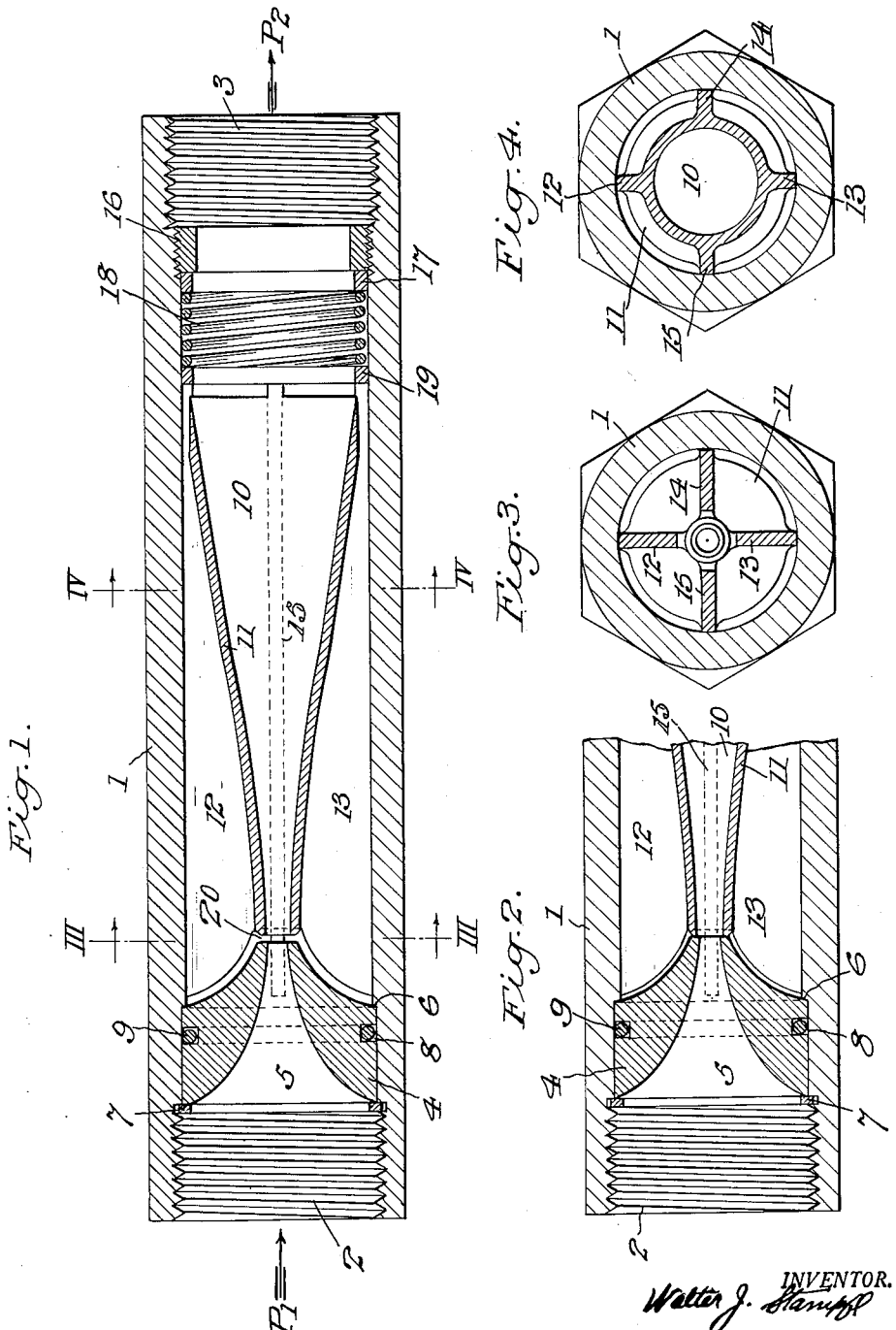
INVENTOR.
Walter J. Stampfl
BY
Brown + Seward
his ATTORNEYS Patented Mar. 18, 1952

2,589,888

UNITED STATES PATENT OFFICE 2,589,888

FLOW CONTROL DEVICE

Walter J. Stampfl, Cleveland Heights, Ohio

Application February 25, 1948, Serial No. 10,780

7 Claims. (Cl. 138—45)

This invention relates to a flow control device whereby a predetermined rate of flow therethrough of a fluid (gas or liquid) is automatically controlled or substantially maintained.

Heretofore, employment of a valve using a fixed orifice or orifices has been customary, but in such devices variations in the pressure differential between inlet and outlet change the rate of flow accordingly. Therefore, in order to maintain a relatively constant rate of flow it has been necessary to make use of external means for maintaining the desired pressure differential by regulating the flow at the inlet or outlet. It will thus be seen that to maintain the desired pressure differential and thereby the rate of flow through the device it was necessary to vary either the pressure at the inlet or outlet or change the size of the orifice by substituting parts, or a combination of things might be done to secure the desired result.

The object of this invention is to provide a flow control valve having a novel means of self-regulation whereby the flow rate of a fluid therethrough is maintained at a substantially constant value even when the fluid is subjected to varying pressure conditions at or between inlet and outlet.

Another object is to provide a valve of this type which can be adjusted to accommodate itself to a range of fluid flow rates without the necessity of changing the pressure conditions at the inlet or outlet and without any changes in the size, shape, or location of the several parts.

Another object is to provide a valve of this type which is a self-contained unit capable of accomplishing the above and other objects hereinafter mentioned.

Another object is to provide a valve of this type comprising a casing having elements located therein for directing a fluid through said casing and elements and thereby automatically controlling the flow of said fluid.

A further object is to provide a novel means of controlling flow wherein the elements are of simple design and construction, thus enhancing the ease of manufacturing, assembling, installing and operating same.

Broadly, my invention comprises a flow control device which is self-regulatory.

More specifically it is a valve comprising a casing adapted to accommodate means for supplying a fluid thereto, means for guiding same therethrough and automatically controlling the rate of flow, and means for receiving a desired outlet and inlet.

Referring to the accompanying drawings:

Fig. 1 represents a vertical longitudinal central section of the preferred embodiment of my invention;

Fig. 2 represents a detail of the form shown in Fig. 1 with the slidable member in its "seated" position;

Fig. 3 is a vertical section taken on the line III—III of Fig. 1, looking in the direction of the arrows, and Fig. 4 represents a vertical section taken on the line IV—IV of Fig. 1, looking in the direction of the arrows.

A tubular unitary outer casing 1 is internally screw-threaded at its ends 2 and 3, to receive a connection from a source of fluid supply (not shown) and another connection with a suitable outlet (not shown) respectively. The intake or inlet end of casing 1, is fitted with a member 4 provided with a Venturi-like bore 5, said member being fixed in place against an annular shoulder 6 of casing 1 by a snap retaining ring 7 of any well known or approved type. The annular groove 8 in the outer surface of member 4 is filled with a suitable packing material 9 whereby a substantially fluid tight seal is effected between the periphery of member 4 and the inner surface of the valve casing 1. It will thus be seen that the fluid is directed through a Venturi-like approach provided from the inner ends of threads 2 in casing 1 through fixed member 4 to the small end of the tapered bore 10 of a tapered slidable nozzle or diffuser cone 11. The exterior of the latter may be furnished with any desired number of suitable devices such as spaced guide vanes 12, 13, 14, 15 affixed thereto or formed integral therewith and arranged to contact the inner surface of casing 1 to properly guide the slidable nozzle 11 therein and thereby prevent any undesirable lateral movement thereof during the longitudinal movement of said nozzle 11 in said casing 1.

An adjusting screw ring 16 is threaded into casing 1 and abuts against slidable retaining ring 17 which, in turn, abuts against spring 18 compressed between said ring 17 and a similar ring 19 adjacent and abutting the vane ends at the large end of slidable nozzle or diffuser cone 11.

It will be seen from the above that the parts of the valve when assembled, but not in operation, will normally assume the positions indicated in Fig. 2 with the small tapered end of slidable nozzle 11 seated and held against the small tapered end of member 4 by the pressure of spring 18 on ring 19.

The operation of the flow control valve is as follows. A fluid under pressure from any suitable source (not shown) is introduced into the valve in the direction of the arrow $P_1$ (Fig. 1) which is intended to indicate the direction of flow toward the valve outlet and therefrom as indicated by arrow $P_2$ (Fig. 1). It will be understood that the pressure at $P_1$ is greater than at $P_2$ to cause flow in the direction indicated.

As fluid (liquid or gas) under pressure is forced into the valve, it passes through the Venturi-like flared bore 5 of fixed member 4 and into the small end of tapered bore 10 in slidable nozzle or diffuser cone 11, the parts now being in the position shown in Fig. 2. As the fluid passes along the tapered bore 10 which is of increasing diameter, in the direction of flow, throughout its length, the velocity decreases while the pressure increases in accordance with well known principles. The minimum velocity and consequent higher pressure will occur in bore 10 at the mouth or large end abutting ring 19, which is in direct contrast to the velocity and pressure obtaining at the small end of bore 10 into which the flow from flared bore 5 is introduced.

Part of the fluid under pressure will escape around the large end of nozzle 11 underneath ring 19 into the spaces between the guide vanes noted above, interior of casing 1, and exterior of nozzle or cone 11. Since the ends of vanes 12, 13, 14, 15 space ring 19 from the body of nozzle 11, the fluid has easy access to the above mentioned spaces.

It will thus be seen that a condition is set up within the valve wherein a static pressure against the inner walls of nozzle 11 is opposed to a static pressure against the outer walls of said nozzle. Due to the flow into bore 10 from bore 5, the static pressure against the inner wall of nozzle 11 is less than the opposed pressure on the outer wall induced by the relatively stagnant flow in the spaces between the guide vanes mentioned above and the inner wall of casing 1. At this stage, the horizontal components of the pressure against the exterior surface of nozzle 11 (assuming the longest axis of the valve to lie in a horizontal plane) act to move the slidable nozzle or cone 11 against the pressure of spring 18. The extent of this movement of nozzle 11 depends upon the magnitude of the force created by velocity of flow through the valve which is initially determined by the force applied at $P_1$ in the direction of the arrow and the amount of pressure on spring 18. The greater the pressure at $P_1$, the further nozzle 11 will move against said spring pressure.

As soon as the nozzle 11 slides as above described, a gap 20 (see Fig. 1) of varying width depending on amount of slide is created between the small end of nozzle 11 and the face of member 4, which gap also communicates with the spaces between the guide vanes 12, 13, 14, 15.

Since, for reasons set forth above, the fluid static pressure is greater in these spaces where they meet the gap than in the small end of the tapered bore 10, a secondary flow of a quantity dependent on the main flow velocity and the width of the gap 20 is introduced into the main flow through said gap. The introduction of this secondary flow has the effect of decreasing the main flow velocity which, as noted above, will result in a decrease in the static pressure in the spaces amongst the vanes. Spring 18 will then tend to close the gap 20 between nozzle 11 and member 4 and the original rate of flow will be resumed. It will thus be seen that any sudden increase in pressure at $P_1$ will cause the nozzle 11 to slide and this in turn introduces greater secondary flow through gap 20 which serves to decrease the flow velocity, thereby ensuring a relatively steady and constant output at $P_2$.

It should be noted that the normal operating condition of the valve would be partially open (Fig. 1) so the nozzle 11 would be in a position to slide either way to give the desired effect when for any reason pressure at $P_1$ either increased or decreased.

The setting of adjusting screw threaded ring 16 is determined according to the amount of pressure available at $P_1$ and the rate of flow desired through the valve. Spring 18 would normally be put under more compression for heavier pressures than for light and this is accomplished merely by turning ring 16 against ring 17 and thereby compressing spring 18 between the rings 17 and 19.

It will be understood that various changes may be resorted to in the construction, form and arrangement of the several parts without departing from the spirit and scope of my invention and therefore I do not intend to be limited to the particular embodiment herein shown and described, except as set forth in the following claims.

What I claim is:

1. A valve comprising a casing, a fixed member at one end thereof, a hollow member adjacent to said fixed member and slidable in said casing, means for directing a fluid through said members and thereby controlling the rate of flow therethrough, said means comprising a bore of decreasing diameter in the fixed member alined with a bore of increasing diameter in the slidable member, means for limiting the movement of the slidable member, and an outlet at the opposite end from the said fixed member.

2. A valve comprising a unitary tubular outer casing adapted to receive an inlet at one end and an outlet at the opposite end, a shoulder in said casing, a fixed member held in the inlet end of the casing against said shoulder by a snap ring, and means sealing said member against the inner surface of said casing, said member being provided with a central flared bore of decreasing diameter, a slidable nozzle seated against said fixed member's inner end, said nozzle having a central bore of increasing diameter toward the outlet end of the casing aligned with the bore of the fixed member, guide vanes on said nozzle contacting the inner wall of the casing, spaces between said vanes, spring pressed means holding the nozzle to a predetermined throw, means for adjusting said spring pressed means in compression, all of said means within the casing being adapted for controlling the rate of flow of a fluid from inlet to outlet of the valve casing.

3. A valve comprising a casing, a member fixed at one end thereof, an entry orifice in said member, a diffuser cone alined with said orifice and slidable in said casing, means for directing a fluid through said orifice and diffuser cone and thereby controlling the rate of flow therethrough, said means comprising a bore of decreasing diameter in the fixed member alined with a bore of increasing diameter in the diverging nozzle, means limiting the movement of said nozzle and an outlet at the opposite end from said fixed member.

4. A valve comprising a casing, a fixed bored member at one end of said casing and an adjacent slidable bored member alined therewith and housed in said casing, means for directing a fluid and automatically controlling the rate of flow thereof through said members, said means comprising a bore of decreasing diameter in the fixed member alined with a bore of increasing diameter in the slidable member, means limiting the movement of the slidable member, an outlet longitudinally alined with the latter at the opposite end from said fixed member and means guiding said slidable member in said casing comprising elements spaced from one another on the exterior of the slidable member contacting the inner surface of said casing and extending beyond the end of said slidable member furthest from said fixed member.

5. A valve comprising a unitary casing open at both ends, a member fixed in one end of said casing and provided with a bore of decreasing diameter, a slidable member adjacent thereto and provided with a bore tapered toward the fixed member and alined with the bore of the fixed member, means for controlling said slidable member comprising a resilient means adjacent its end furthest from said fixed member, and other means for adjusting said resilient means in compression located beyond the other end of said resilient means.

6. A valve comprising a unitary casing open at both ends, a bored member fixed in one end, a bored slidable member in said casing having its bore alined with the bore of the fixed member, means for automatically controlling both the longitudinal movement of said hollow member and the rate of flow of a fluid through said casing and members, and other means guiding said slidable member in said casing, said last named means comprising elements spaced from each other carried by and extended beyond the end of said slidable member furthest from said fixed member, the parts being so constructed and arranged that fluid access is provided from the interior of the slidable member at its last named end to the spaces between the said elements.

7. A valve comprising a unitary casing, a fixed member and a slidable member located adjacent thereto in said casing, bores in each of said members longitudinally alined with each other, means for automatically controlling the rate of flow of a fluid through said casing and members, and other means guiding said slidable member in said casing comprising spaced elements projected beyond both ends of said slidable member, the parts being so constructed and arranged that fluid communication is established between the bore of the slidable member, the spaces between the said elements and the bore of the fixed member.

WALTER J. STAMPFL.

REFERENCES CITED

The following references are of record in the file of this patent:

UNITED STATES PATENTS

| Number | Name | Date |
|---|---|---|
| 813,918 | Schmitz | Feb. 27, 1906 |
| 1,861,375 | Ahnberg | May 31, 1932 |
| 1,879,197 | Greenwald | Sept. 27, 1932 |
| 1,964,638 | Kreidel | June 26, 1934 |
| 2,104,853 | Daubenmeyer | Jan. 11, 1938 |
| 2,149,673 | Godfrey | Mar. 7, 1939 |
| 2,218,318 | Pfauser | Oct. 15, 1940 |
| 2,230,221 | Fitch | Feb. 4, 1941 |
| 2,327,611 | Scheiwer | Aug. 24, 1943 |
| 2,456,626 | Dahnke | Dec. 21, 1948 |